(12) United States Patent
Santos

(10) Patent No.: US 7,722,492 B2
(45) Date of Patent: May 25, 2010

(54) CLOSING LINK FOR A BICYCLE CHAIN

(75) Inventor: Pedro Santos, Coimbra (PT)

(73) Assignee: SRAM Deutschland GmbH, Schweinfurt (DE)

( * ) Notice: Subject to any disclaimer, the term of this patent is extended or adjusted under 35 U.S.C. 154(b) by 200 days.

(21) Appl. No.: 11/671,151

(22) Filed: Feb. 5, 2007

(65) Prior Publication Data
US 2007/0197333 A1   Aug. 23, 2007

(30) Foreign Application Priority Data
Feb. 4, 2006   (DE) .................. 10 2006 005157

(51) Int. Cl.
F16G 13/02   (2006.01)
F16G 13/00   (2006.01)
F16G 15/06   (2006.01)

(52) U.S. Cl. .................. 474/227; 474/206; 474/219; 474/220; 474/224; 59/78; 59/85

(58) Field of Classification Search ................ 474/227, 474/223–226, 206; 59/78, 85, 4; 74/258
See application file for complete search history.

(56) References Cited

U.S. PATENT DOCUMENTS

| | | | | |
|---|---|---|---|---|
| 237,771 | A | * | 2/1881 | Paine .......................... 474/227 |
| 245,780 | A | * | 8/1881 | Brough ........................ 474/227 |
| 2,687,651 | A | * | 8/1954 | Webb .......................... 474/227 |
| 5,178,585 | A | | 1/1993 | Lin |
| 5,291,730 | A | * | 3/1994 | Wu ................................ 59/85 |
| 5,305,594 | A | * | 4/1994 | Wang ............................ 59/85 |
| 5,362,282 | A | * | 11/1994 | Lickton ...................... 474/220 |
| 5,427,559 | A | * | 6/1995 | Glickman et al. ........... 446/103 |
| 6,364,799 | B1 | | 4/2002 | Campagnolo |
| 6,390,943 | B1 | | 5/2002 | Dreger |

| | | | |
|---|---|---|---|
| 2004/0033854 | A1 | | 2/2004 | Wu |

FOREIGN PATENT DOCUMENTS

| | | |
|---|---|---|
| CH | 16852 | 2/1899 |
| DE | 93 284 | 8/1897 |
| DE | 91 07 669 U1 | 8/1991 |
| DE | 92 12 164 U1 | 11/1992 |
| DE | 44 31 614 A1 | 3/1995 |

(Continued)

Primary Examiner—Robert A Siconolfi
Assistant Examiner—San Aung
(74) Attorney, Agent, or Firm—Milan Milosevic; Lisa Serdynski

(57) ABSTRACT

A closing link for a bicycle chain that includes a first outer link plate having a first elongated hole and a first chain pin extending therefrom and a second outer link plate having a second elongated hole and a second chain pin extending therefrom. The first chain pin is received in the second elongated hole and the second chain pin is received in the first elongated hole Each chain pin has a head at one end, a foot at the other end and a groove therebetween. Each elongated hole has a larger diameter end, a smaller diameter end and a displacement region therebetween. The larger diameter end has a diameter larger than a diameter of the pin head. The smaller diameter end receives the groove of the chain pin and includes a countersink to receive the pin head. The displacement region includes sides having recessed and unrecessed portions. The recessed portions have a smaller depth than a depth of the countersink at least in the region of the countersink.

6 Claims, 5 Drawing Sheets

FOREIGN PATENT DOCUMENTS

| | | |
|---|---|---|
| DE | 101 59 773 A1 | 10/2002 |
| DE | 202 12 596 U1 | 2/2003 |
| EP | 1 498 217 A2 | 1/2005 |
| FR | 963 306 | 7/1950 |
| GB | 1 399 954 | 7/1975 |
| GB | 21 37 725 A | 10/1984 |

\* cited by examiner

CLOSING LINK FOR A BICYCLE CHAIN

BACKGROUND OF THE INVENTION

The present invention relates to bicycle chains and more particularly to a closing link for a bicycle chain that may be used to connect and disconnect adjoining chain links without a tool.

Driving chains for bicycles include chain links pivotably arranged with respect to each other to form a closed loop to transmit the chain driving force. Interior spaces between the chain links receive the teeth of the sprockets or chainrings. To easily remove the chain from bicycle for maintenance, a closing link is provided to disconnect the chain.

DE 44 31 614 A1 discloses a closing link for a chain. The closing link has a narrow design and includes a pair of parallel link plates and a pair of parallel pins connected therebetween. Each plate includes an elongated hole that has a large diameter at one end to allow insertion of the pin. Each pin includes a groove near the pin head that is wider than the thickness of the link plate and the position of the groove from the end of the pin is smaller than the thickness of the link plate. The other end of the elongated hole is countersunk to such a depth that, in the installed state, the pin head latches in place and partially protrudes beyond the outer surface of the outer link plate. When connecting adjoining links of the chain, the chain pins are inserted into the inner link plates of the open chain such that the outer link plates of the closing link lie opposite each other in a mirror-inverted manner. To connect the chain, first the ends of the chain are drawn together, then the free ends of the chain pins are pushed through the larger diameter end of the elongated hole of the mating outer link plate. Upon tensioning the chain, the chain pins move along the elongated hole toward the countersink until the pin head latches into the countersink at the other end of the elongated hole. To disconnect the chain, the chain is drawn together at the closing link causing the two mating outer link plates of the closing link to slide relative to each other to dislodge the pin head out of the countersink, thereby displacing the chain pin to the larger diameter end of the elongated hole. In this position, the chain pins can be withdrawn from of the link plates thereby disconnecting the chain.

One drawback of the above closing link is that the pin head protrudes beyond the outer surface of the outer link plate which is not suitable for derailleurs with many sprockets having minimal spacing therebetween. Another drawback is that a large groove on the pin head results in undesirable lateral movement of the chain in the region of the closing link that may have an adverse effect on the shifting behavior of the chain.

SUMMARY OF THE INVENTION

The present invention provides a chain closing link with a flush pin head geometry and reduces the lateral movement of the chain in the region of the closing link. Further, the closing link provides a secure chain pin connection between mating outer link plates and safeguards against disassembly of the chain.

The closing link includes first and second outer link plates that are joined together. The first outer link plate includes a first elongated hole and a first chain pin extending therefrom. The second outer link plate includes a second elongated hole and a second chain pin extending therefrom. During connection, the first chain pin is received in the second elongated hole and the second chain pin is received in the first elongated hole. Each chain pin has a head at one end, a foot at the other end, and a groove therebetween. Each elongated hole includes a larger diameter end, a smaller diameter end and a displacement region therebetween. The larger diameter end has a diameter that is larger than a diameter of the mating pin head. The smaller diameter end receives the groove of the mating chain pin and includes a countersink for receiving the pin head. The displacement region includes sides having recessed and unrecessed portions. The recessed portions have a shallower depth than a depth of the countersink, at least in the region of the countersink.

In one embodiment of the present invention, a span between the unrecessed portions of the sides of the displacement region decreases from the larger diameter end toward the smaller diameter end to safeguard against disassembly of the closing link. The narrowest span is smaller than the diameter of the pin groove to provide a latching function. This configuration protects an inadvertent release of the pin head from the countersink and movement of the pin toward the displacement region caused by a lateral impact against the chain.

In another embodiment of the present invention, a span between the recessed portions of the sides of the displacement region decreases from the larger diameter end toward the countersink. The narrowest span is smaller than the diameter of the pin head. This configuration safeguards against disassembly by latching the chain pin into its end position with the pin head seated in the countersink. The recessed portions may have a flat base proximate the countersink and a sloped base proximate the larger diameter end, the sloped base sloping or tapering down from the flat base toward the larger diameter end to ease installation. Preferably, the height of the pin head does not exceed the depth of the countersink.

In yet another embodiment of the present invention, the outer link plate includes a pin bore for receiving the pin foot. The pin foot is preferably deformably attached to the outer link plate at the pin bore. In one embodiment, the pin foot does not extend beyond the outer surface of the outer link plate and includes a tool bore extending axially along the pin for receiving a punch. To connect the chain pin to the outer link plate, the pin bore is countersunk, the countersink configured to receive the widened end of the pin foot deformed by the punch thereby securely connecting the pin to the outer link plate.

In the present invention, the pin head and the countersink are configured to provide a flush connection. Previously, during the closing of the closing link, the pin head protruded beyond the outer link plate before it could enter the countersink in the end position. In contrast, in the present invention, the surface of the pin groove slides along the outside of the outer link plate and the pin head displaces along the recessed portion from the larger diameter end to the countersink, allowing the length of the chain pin to be reduced. This configuration provides a closing link that permits a narrower chain that can be used with derailleurs having more sprockets. Further, reducing the distance between the pin foot and pin head also reduces play, in the longitudinal direction of the chain pin, between the pin head and the opposite outer link plate, thereby reducing the lateral movement of the chain in the region of the closing link.

Another objective of the present invention is to provide a closing link that safeguards against inadvertent disconnection of the closing link. Further, the two outer link plates of the closing link may be connected and disconnected without a tool.

These and other features and advantages of the present invention will be more fully understood from the following description of certain embodiments of the invention, taken together with the accompanying drawings.

DETAILED DESCRIPTION

Figure 1:
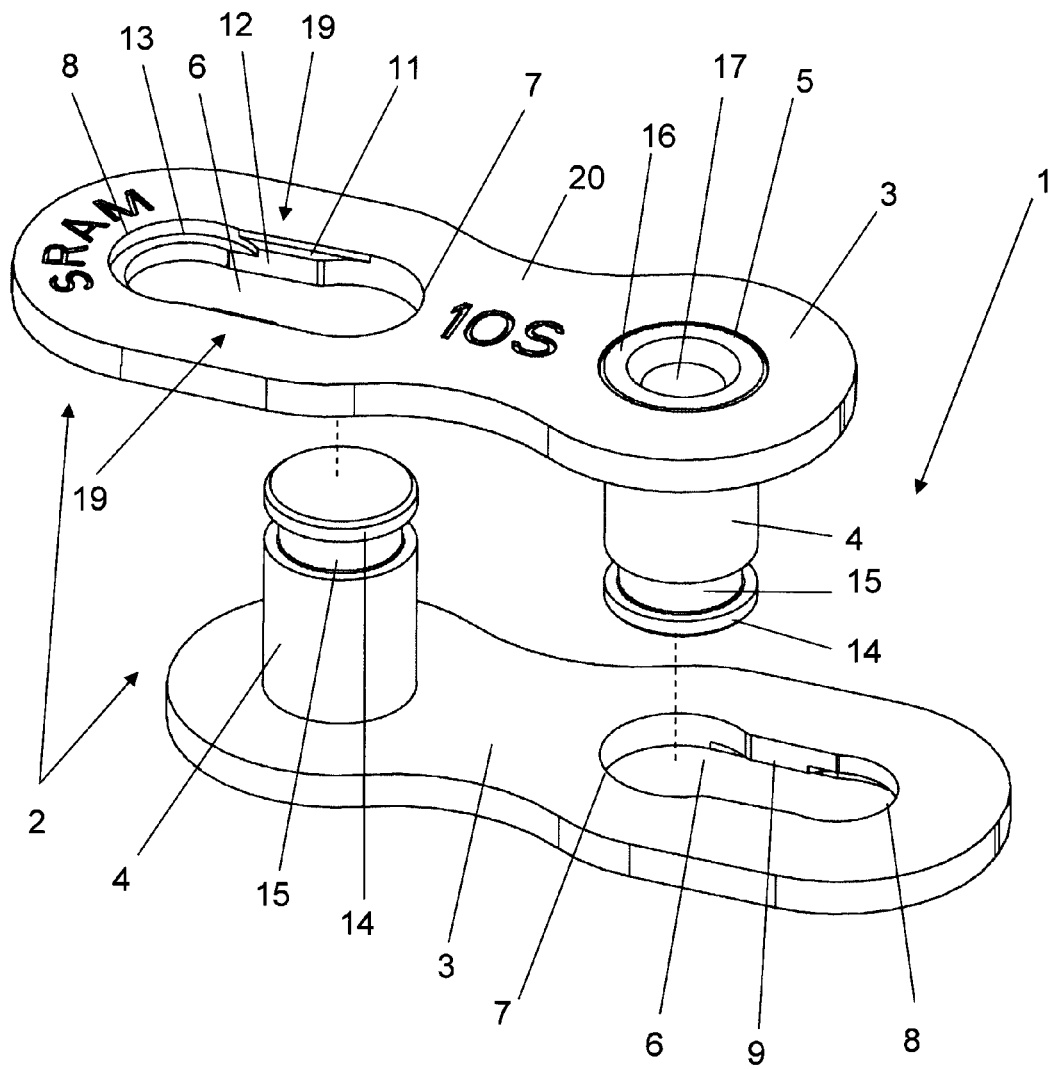
FIG. 1 is a perspective view of a closing link according to one embodiment of the present invention.

FIG. 1 illustrates a closing link 1 according to one embodiment of the present invention. The closing link 1 generally includes two closing parts 2, each including an outer link plate 3 and a chain pin 4 extending therefrom. The outer link plate 3 includes an elongated hole 6. To connect the closing link 1, the chain pins 4 of the closing parts 2 are inserted into the elongated holes 6 of the mating closing part 2.

The chain pin 4 has a head 14 at one end, a foot 16 at the other end and a groove 15 therebetween. The outer link plate 3 also includes a pin bore 5 for permanent attachment of the pin foot 16. The elongated hole 6 has a larger diameter end 7, a smaller diameter end 8 and a displacement region 9 therebetween. The larger diameter end 7 has a larger diameter than the pin head 14 for receiving the pin head 14 of the mating chain pin. The smaller diameter end 8 has a countersink 13 for seating the pin head 14. The displacement region 9 is the path along which the chain pin 4 is displaced after being inserted into the elongated hole 6 until the pin head 14 latches into the countersink 13. The displacement region 9 includes sides 19, each having an unrecessed portion 12 and a recessed portion 11 disposed in an outer surface 20 of the outer link plate 3. When connecting the chain pin 4, a bottom surface 22 of the pin head 14 slides along the recessed portion 11. The countersink 13 is deeper than the recessed portion 11 to allow the pin head 14 to latch into the countersink 13.

To minimize the width of the chain, the length of the chain pin 4 may be reduced. The pin head 14 is sized to not protrude beyond the depth of the countersink 13. Also, the recessed portions 11 are configured to allow a shorter chain pin because the pin head 14 is no longer displaced along the outer surface 20 of the outer link plate 3 during attachment but rather along the recessed portions 11 disposed below the outer surface 20.

Figure 2:
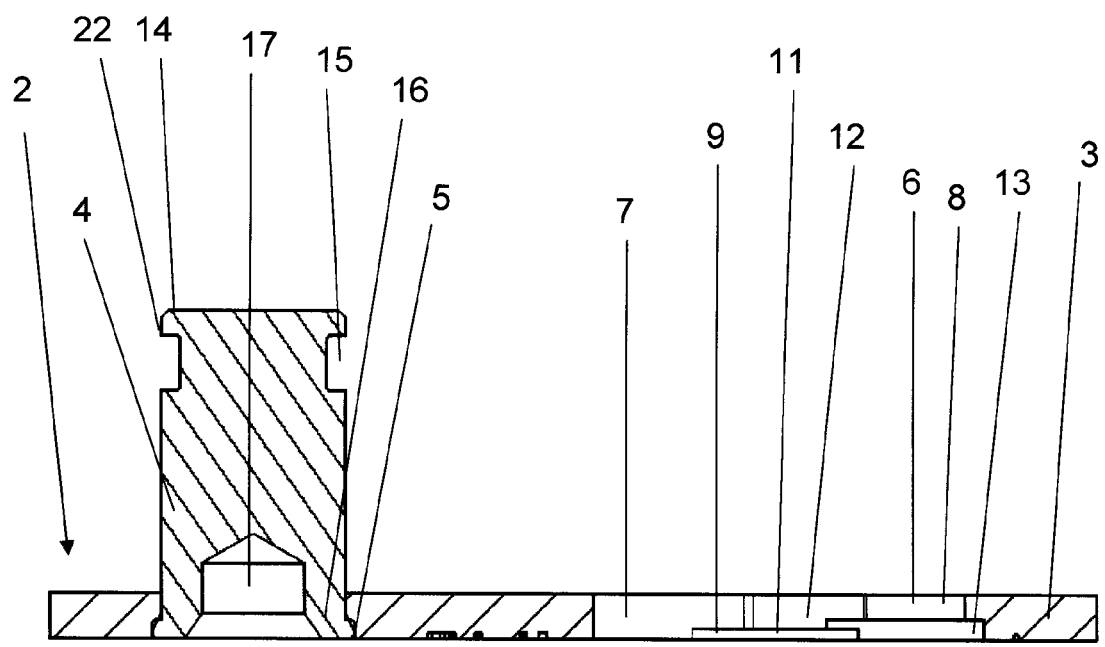
FIG. 2 is a cross-sectional view of a closing part of the closing link of FIG. 1.

Looking to FIG. 2, in one embodiment of the present invention, the pin foot 16 of the chain pin 4 is deformably attached to the outer link plate 3 at the pin bore 5. The chain pin 4 includes an axially extending tool bore 17 and the pin bore 5 has a countersink. The chain pin 4 is fixed to the outer link plate 3 by inserting the pin foot 16 into the pin bore 5 and widening the foot 16 by inserting a punch in the tool bore 17 to deform the foot 16 against the countersink of the pin bore 5. This forms a permanent connection, preventing the chain pin 4 from being pulled out of the outer link plate 3.

Despite the latching of the pin head 14 to the countersink 13, the closing link 1 may be disconnected by a lateral impact against the slack side of the chain. To safeguard against this unintentional disconnect of the closing link 1, the sides 19 of the elongated hole 6 may be narrowed near the countersink 13. Looking to FIGS. 3a and 3b, in one embodiment of the present invention, a span between the unrecessed portions 12 of the sides 19 of the displacement region 9 is narrowed from the larger diameter end 7 toward the smaller diameter end 8, the narrowest span located near or adjacent the countersink 13. In the embodiment shown in FIG. 3b, the span A between unrecessed portions 12 of the sides 19 is smaller than the diameter of the pin groove 15 while the span B is larger than the diameter of the pin groove 15. When connecting the closing link 1, the pin head 14 slides over the recessed portion 11 until it approaches the narrowest span A between the unrecessed portions 12 of the sides 19 and then with some additional effort is pushed beyond this point until the pin head 14 latches into the countersink 13. This narrowing span safeguards against disconnect of the pin head 14 from the countersink 13 caused by an unintentional displacement of the chain pin 4.

Figure 3A:
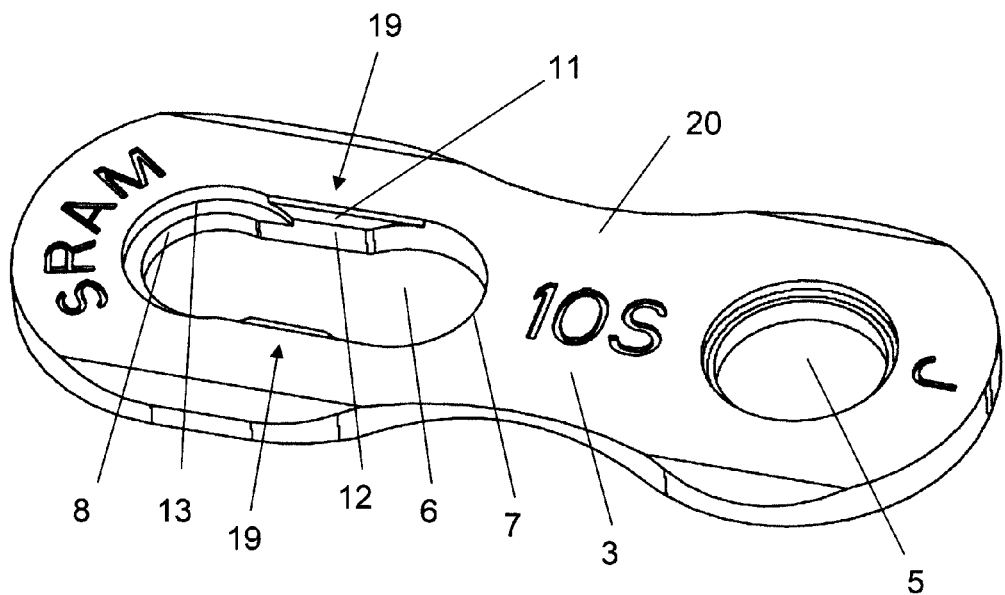
FIGS. 3a and 3b are perspective and top views, respectfully, of an outer link plate of a closing link according to one embodiment of the present invention.
Figure 3B:
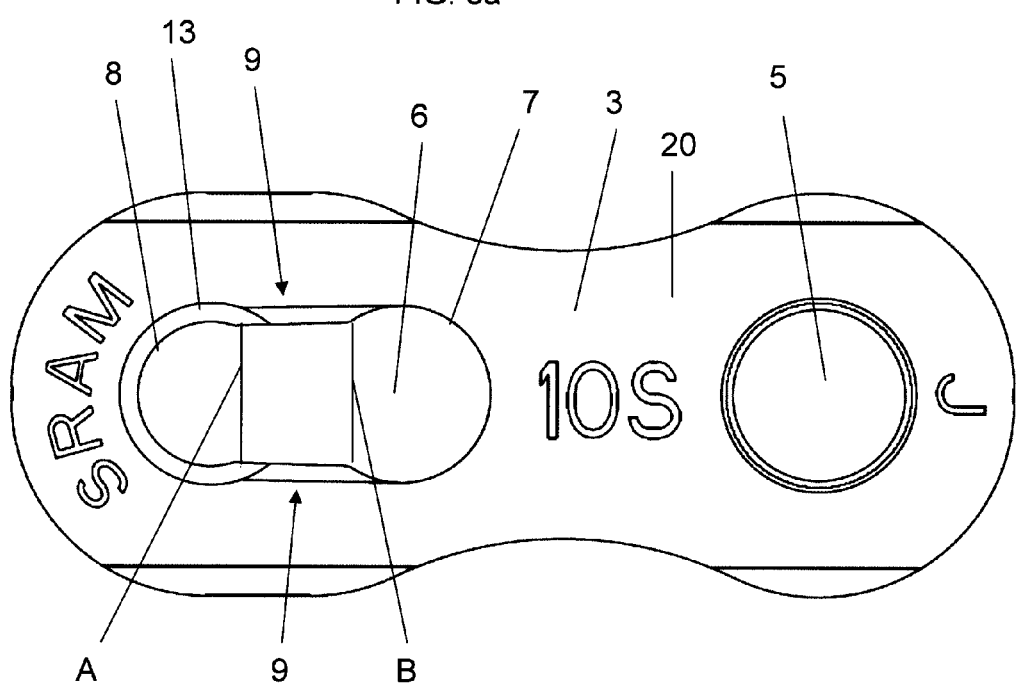
Figure 4A:
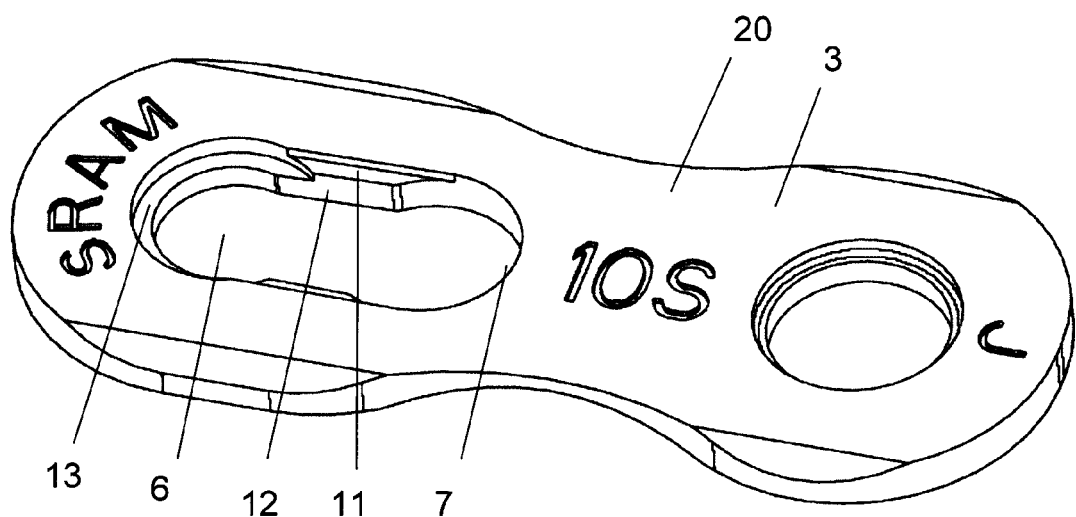
FIGS. 4a and 4b are perspective and top views, respectfully, of an outer link plate of a closing link similar to the outer link plate of FIGS. 3a and 3b, except with sides of a displacement region having narrowed recessed portions.
Figure 4B:
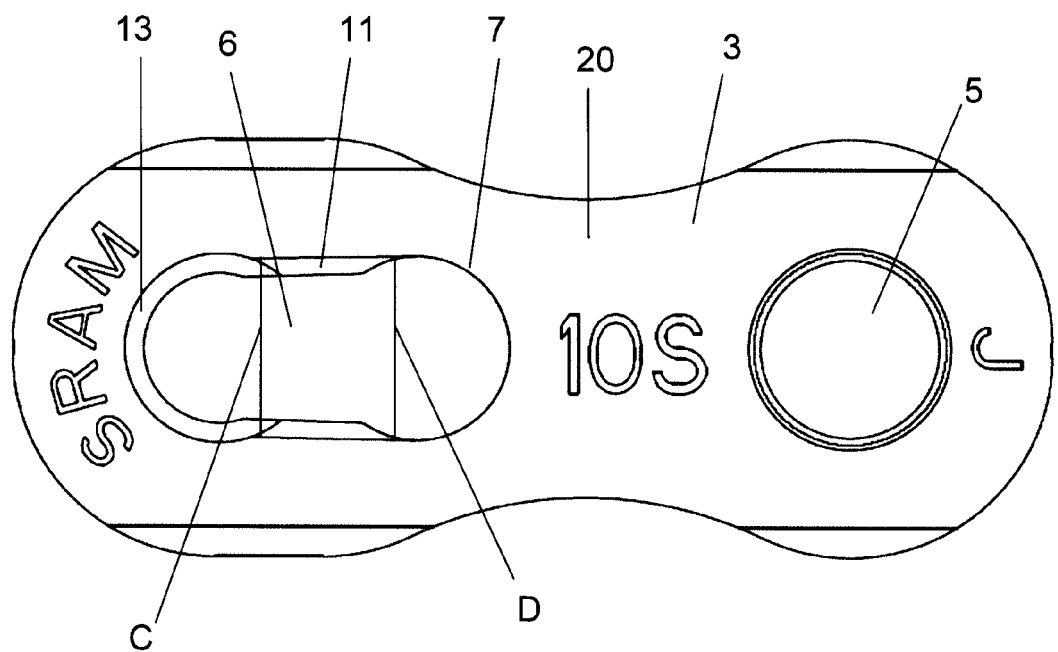

Looking to FIGS. 4a and 4b, in addition to or alternatively to the narrowing of unrecessed portions 12 of the sides 19 shown in FIGS. 3a and 3b, the recessed portions 11 may be likewise narrowed. A span between the recessed portions 11 of the sides 19 is narrowed from the larger diameter end 7 toward the smaller diameter end 8. In the embodiment shown in FIG. 4b, the span C is smaller than the diameter of the pin head 14 while the span D is larger than the diameter of the pin head 14. As stated above, during the closure of the closing link 1, the pin head 14 slides over the recessed portions 11, then shortly before the head 14 latches into the countersink 13, the narrowest span C between the recessed portions 11 is passed with additional effort. This narrowing point likewise safeguards against inadvertent disconnect of the closing link 1.

Figure 5A:
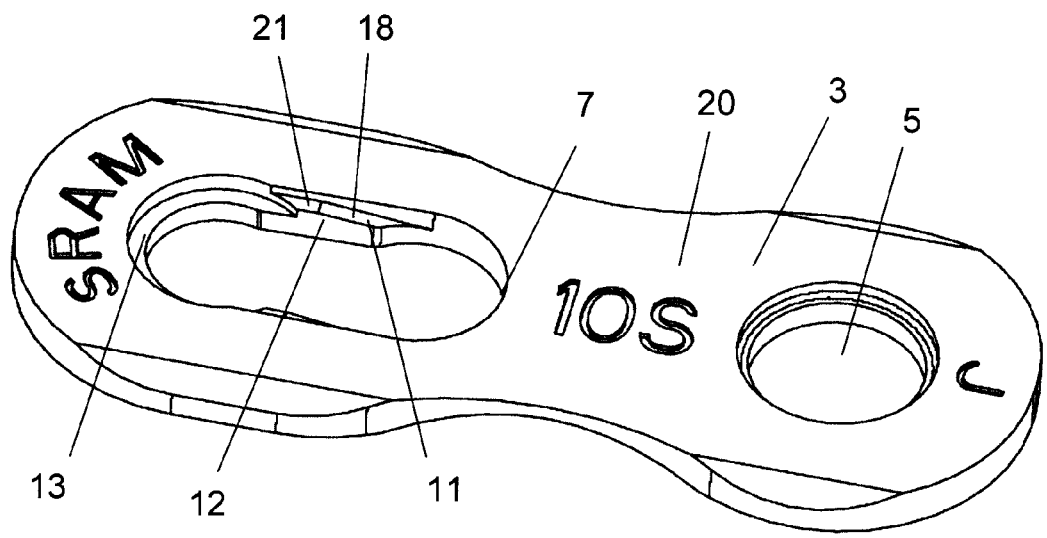
FIGS. 5a and 5b are perspective and top views, respectfully, of an outer link plate of a closing link similar to the outer link plate of FIGS. 4a and 4b, except with sides of the displacement region having flat and sloped bases on the recessed portions.
Figure 5B:
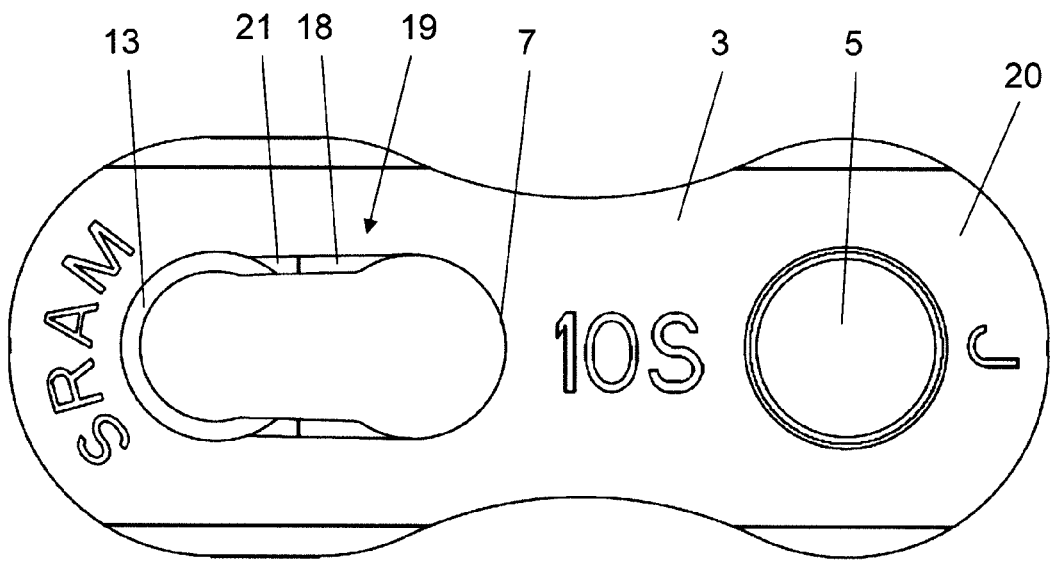

Looking to FIGS. 5a and 5b, in one embodiment of the present invention, the recessed portions 11 include a flat base 21 proximate the countersink 13, and a sloped base 18 proximate the larger diameter end 7. The slopped base 18 drops from the flat base 21 down toward the larger diameter end 7. The sloped base 18 near the larger diameter end 7 eases the sliding of the pin head 14 along the recessed portion 11. The slope base 18 rises to the flat base 21 creating a transition therebetween that pinches the pin head 14 during connection of the closing link 1. This configuration also safeguards against inadvertent disconnect of the closing link 1.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed:
1. A closing link for a bicycle chain, comprising:
   a first outer link plate having a first outer surface, a first elongated hole and a first chain pin extending therefrom; and
   a second outer link plate having a second outer surface, a second elongated hole and a second chain pin extending therefrom,
   the first chain pin received in the second elongated hole, the second chain pin received in the first elongated hole, each chain pin having a head at one end, a foot at the other end and a groove therebetween, each elongated hole having a larger diameter end, a smaller diameter end and a displacement region therebetween, the larger diameter end having a diameter larger than a diameter of the pin head, the smaller diameter end receiving the groove of the chain pin and including a countersink having a depth from the link plate outer surface to receive the pin head, the displacement region including sides having recessed portions having a smaller depth from the link plate outer surface than the depth of the countersink at least in the region of the countersink.

2. The closing link according to claim 1, wherein the sides include unrecessed portions, a span between the unrecessed portions of the sides of the displacement region decreases from the larger diameter end toward the smaller diameter end, the narrowest span being smaller than a diameter of the pin groove.

3. The closing link according to claim 1, wherein a span between the recessed portions of the sides of the displacement region decreases from the larger diameter end toward the countersink, the narrowest span being smaller than a diameter of the pin head.

4. The closing link according to claim 1, wherein the recessed portion includes a flat base proximate the countersink, and a sloped base proximate the larger diameter end, the sloped base sloping down from the flat base toward the larger diameter end.

5. The closing link according to claim 1, wherein a height of the pin head does not exceed the depth of the countersink.

6. The closing link according to claim 1, wherein the outer link plate includes a pin bore for receiving the pin foot, the pin foot deformably attached to the outer link plate at the pin bore.

* * * * *